2 Sheets—Sheet 1.

E. BROWN.

PYROMETER.

No. 7,702. Reissued May 29, 1877.

Witnesses

John F. Grant

D. Louis Shivers

Inventor:

Edw.d Brown.

2 Sheets—Sheet 2.

E. BROWN.

PYROMETER.

No. 7,702. Reissued May 29, 1877.

Witnesses.
John F. Grant
D. Louis Shivere

Inventor.
Edw. Brown

UNITED STATES PATENT OFFICE.

EDWARD BROWN, OF PHILADELPHIA, PENNSYLVANIA.

IMPROVEMENT IN PYROMETERS.

Specification forming part of Letters Patent No. 90,815, dated June 1, 1869; reissue No. 7,702, dated May 29, 1877; application filed May 14, 1877.

*To all whom it may concern:*

Be it known that I, EDWARD BROWN, of 311 Walnut Street, Philadelphia, Pennsylvania, have invented a new and Improved Hot-Blast Pyrometer, or instrument for indicating high temperatures; and I do hereby declare the following is a full, clear, and exact description thereof, reference being had to the accompanying drawings, and to the letters of reference marked thereon.

My instrument is designed as a test-gage to be applied temporarily to the hot-blast of a smelting-furnace. It is so arranged that the expansion strip or rod can at once be brought under the full temperature of the blast, and as easily detached from it. The expansion of the strip is communicated by suitable levers and gearing to the pointer of a dial secured upon a non-expansion-bar exterior to and free from the influence of the hot-blast. Several other minor points which contribute to the accuracy, durability, and usefulness of the instrument I will hereafter describe, among which is the jacketing of the open conducting-tube, the facility of removing the expansion-bar and replacing it, the arrangement of the expansion-bar upon a tension, whereby a thin strip of metal can be used which will acquire the heat almost instantly, and the manner of communicating the motion to the dial.

Instruments hitherto used for this purpose have only approximated to the temperature, and, in addition, are subject to constant deterioration from oxidation under a continuous high temperature.

To enable others skilled in the art to make and use my invention, I will proceed to describe its construction and operation.

Figure 2:
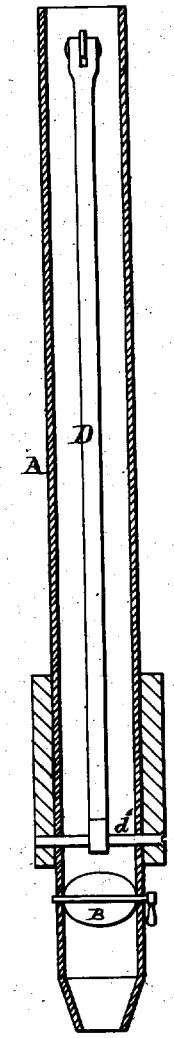
Figure 1:
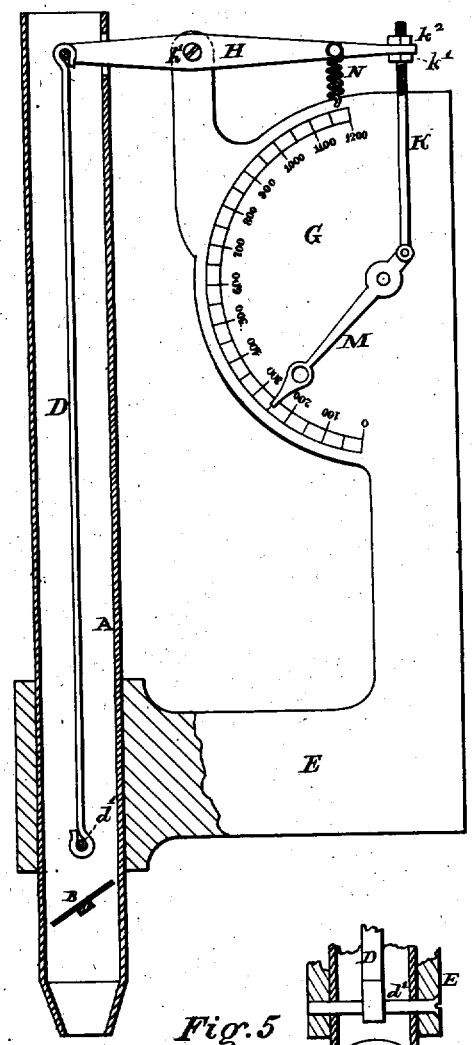
Figure 5:
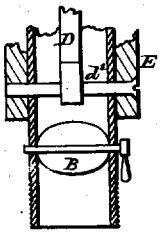
Figure 3:
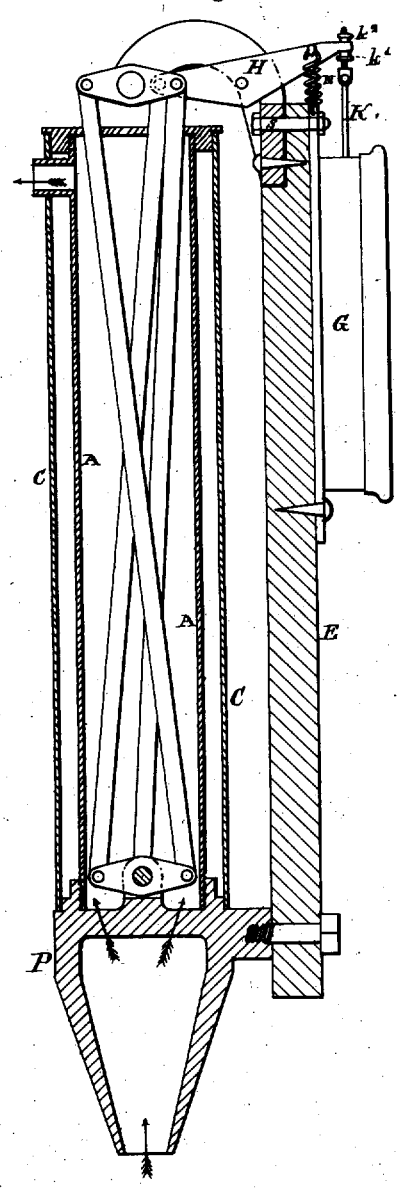
Figure 4:
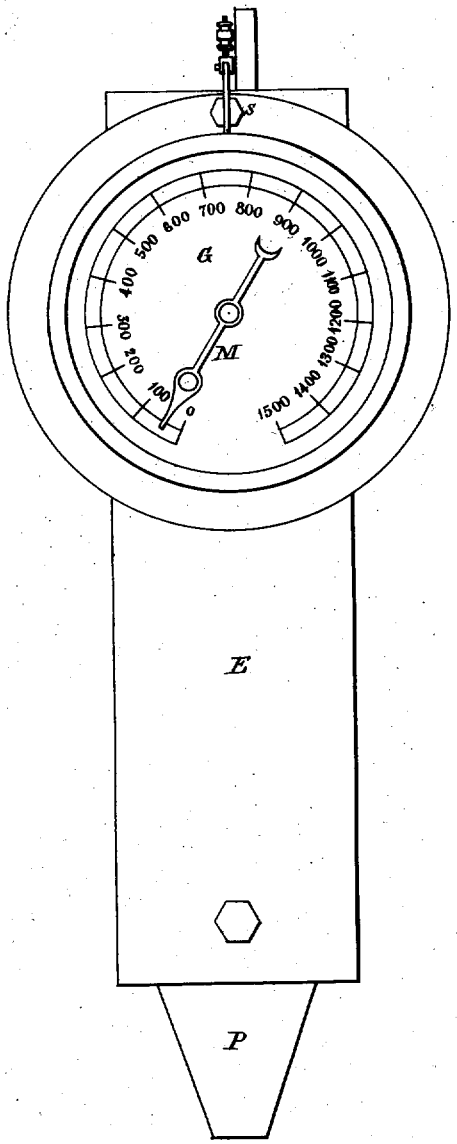

Figure 1 is a side elevation of the instrument in its simplest form, the tube being in section. Fig. 2 is a cross-section through the tube. Fig. 3 is a section showing the details more completely. Fig. 4 is a front view of the instrument. Fig. 5 shows the end of the conducting-tube when the instrument is used as a permanent fixture.

In Fig. 1, A is a thin metal tube of iron, open at the top, and also at the bottom, for the free passage of the hot-blast, which rushes through at its full temperature and pressure as soon as the instrument is applied by hand to any orifice in the main blast-pipe, which mode of using the instrument gives a most accurate indication. When used as a permanent fixture upon the blast-pipe, a valve, B, intervenes to admit the blast for the trial. To the lower end of this tube A is secured the non-expanding bar E, of wood, the least influenced of all materials by a moderate change of temperature. Its upper end carries the dial G. The strip of metal D is secured to the lower end of the tube by pin $d^1$. Its upper end is jointed to the short arm of lever H, which lever is pivoted at $h^1$ upon the upper end of the bar E. To the other end of the lever is attached the rod K, which gives motion to the dial-hand M. The rod K has upon it a screw working in two nuts, $k^1$ $k^2$, by which means the pointer M may be set at the normal temperature of the atmosphere, and adjusted, on replacing the expansion-strip, by a new one. A spring, N, always keeps a tension upon the strip D.

In Fig. 3 will be seen the tube A jacketed by an exterior tube, C, to retain the blast at its original temperature as it passes through the tube A. Both tubes are secured to the lower casting P, which is formed for inserting into the blast-pipe, and for bolting to the non-expansion bar E. In this figure is shown an arrangement of bars, being a modification of that shown in Figs. 1 and 2, by which a greater amount of expansion may be obtained, but I find one bar sufficient in practice. The dial G contains the usual movements of a steam-gage, such as segment and pinion to multiply motion. This dial is secured rigidly to the bar E by a bolt, S, through its upper flange, so that the expansion of the case and the rod K neutralize each other. Thus I have the dial-hand influenced only by the expansion-strip D. By this arrangement of the instrument I can bring the full temperature of the blast upon a thin expansion-strip, and obtain the indication in a few seconds, and before the non-expanding bar and dial can be influenced by its close proximity to the blast-pipe. I thus overcome one of the greatest defects in all pyrometers used for temperatures approximating red heat, viz., the rapid deterioration of the expansion metal used from constant heating and cooling and corrosion.

Having thus described my invention, what I claim as new, and desire to secure by Letters Patent, is—

1. The detachable hand-pyrometer constructed with the tube A, open at each end for the free passage of the hot-blast, in combination with the metal expansion-strip D, arranged therein, for giving motion to the pointer of a dial, secured upon the non-expanding bar E, substantially as described.

2. In a hot-blast pyrometer for temporary indication, the combination of a conductor, having openings for the ingress and egress of the blast, and a valve for admitting the blast upon an expansion-bar within the conductor.

EDWD. BROWN.

Witnesses:
JOHN F. GRANT,
D. LOUIS SHIVERS.